United States Patent

Weissman

[15] 3,675,329

[45] July 11, 1972

[54] DENTAL ANCHORING PIN AND HEAD THEREFOR

[72] Inventor: Bernard Weissman, 304 Ashland Place, Brooklyn, N.Y. 11217

[22] Filed: Jan. 20, 1971

[21] Appl. No.: 108,045

[52] U.S. Cl. ............................................................32/15
[51] Int. Cl. ........................................................A61k 5/02
[58] Field of Search ..........................32/15, 7, 8, 6; 85/61

[56] References Cited

UNITED STATES PATENTS

| 114,454 | 2/1871 | Mack | 32/15 |
| 3,343,443 | 9/1967 | Moore | 85/61 |

Primary Examiner—Robert Peshock
Attorney—Friedman & Goodman

[57] ABSTRACT

A dental anchor for securing a superstructure to a tooth understructure comprising an elongate member which integrally includes a self-threading anchoring portion for operative association with the tooth understructure. The elongate member further includes an enlarged headed anchoring portion for operative association with the superstructure to be mounted upon the understructure. The enlarged head acts to resist or enhance resistance to displacement of the superstructure relative to the understructure axially along the dental anchor. The elongate member is further integrally provided with a manipulating portion for permitting manipulation of the self-threading anchoring portion thereof. The manipulating portion is spaced from the enlarged headed anchoring portion by a weakened portion of reduced thickness the latter for permitting self-severing of the manipulating portion from the enlarged headed anchoring portion selectively.

11 Claims, 7 Drawing Figures

PATENTED JUL 11 1972          3,675,329

BERNARD WEISSMAN
INVENTOR
BY Friedman and Goodman
ATTORNEYS

DENTAL ANCHORING PIN AND HEAD THEREFOR

BACKGROUND OF THE DISCLOSURE

The present invention relates to dentistry in general and more particularly to an improvement in apparatus for building superstructures on broken or undermined dentition.

In the dental operation of anchoring a superstructure to the understructure, there are usually drilled a number of channels into the tooth or understructure. Anchoring pins are then inserted into the channels in protruding relation and the exposed portion of the pins are used for anchoring the superstructure. These pins are extremely small, i.e., on the order of 0.03 inches in diameter and 0.2 inches in length. Inasmuch as these pins are extremely small, there only extends from the understructure, a portion of the pin which is of minimal extent. As a result, therefore, in order to more effectively anchor the superstructure to the understructure, a plurality of these pins must be first embedded in the understructure at various angles relative to one another. The result of the inclined relationship of these anchoring pins relative to one another is to effect an anchoring tendency that one of the pins, if positioned alone in the understructure, would not itself fully accomplish.

More often than not, however, notwithstanding the fact that a plurality of these pins are deposited into the understructure in a manner as discussed above, the anchoring effect diminishes after a period of time and the superstructure eventually loosens from the understructure which is clearly undesirable.

SUMMARY OF THE INVENTION

Accordingly, it is an object of the present invention to provide a highly novel and effective means for building a superstructure on broken or underminded dentition.

Another object is to provide means whereby the potential support capacity of the understructure of the tooth is made available for anchoring the superstructure thereto.

A further object of the invention is to provide a highly novel, efficient and long lasting anchoring means, whereby the superstructure is anchored to broken or underminded dentition.

A still further object of the present invention is to provide a more adequately enhanced resistance against displacement of the superstructure relative to the understructure axially along the anchoring means of the present invention.

Another object of the present invention is to provide an anchoring means with self-severing structure to permit selective severing of the anchoring means at a desirable position.

These objects are achieved by providing a dental anchor for securing a superstructure to a tooth understructure comprising an elongate member which integrally includes a self-threading anchoring portion for operative association with the tooth understructure. The elongate member further includes an enlarged headed anchoring portion for operative association with the superstructure to be mounted upon the understructure. The enlarged head acts to resist or enhance resistance to displacement of the superstructure relative to the understructure axially along the dental anchor. The elongate member is further integrally provided with a manipulating portion for permitting manipulation of the self-threading anchoring portion thereof. The manipulating portion is spaced from the enlarged headed anchoring portion by a weakened portion of reduced thickness, the latter for permitting self-severing of the manipulating portion from the enlarged headed anchoring portion selectively.

BRIEF DESCRIPTION OF THE DRAWINGS

Other objects and many of the attendant advantages of the present invention will be readily appreciated and better understood by reference to the following detailed description when considered in connection with the accompanying drawing in which like reference numerals designate like parts throughout the figures thereof and wherein.

DETAILED DESCRIPTION OF THE INVENTION

Figure 1:
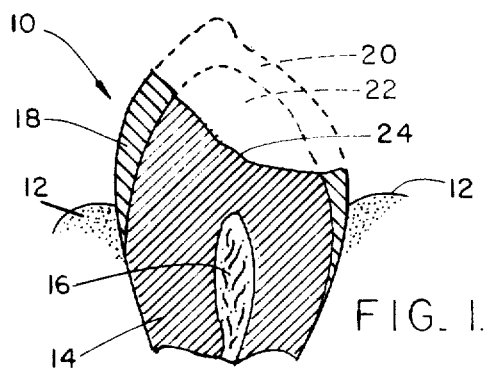
FIG. 1 is a cross-sectional view of a tooth or dentition with its surface excavated prior to building a superstructure thereon.

Referring now to the drawing, wherein like reference characters designate like or corresponding parts throughout the several views, there is shown in FIG. 1 a tooth or dentition 10 in the soft tissue or gingiva 12 of the human gum. As is well known to those skilled in the art, the body 14 of the tooth 10 is formed of dentin and encloses a pulp channel 16. The dentin projecting from the gingiva is covered by a layer 18 of enamel. In order to prepare the dentition for building a superstructure thereon, a portion 20 of the enamel and a portion 22 of the dentin are excavated, thereby to remove decayed and underminded understructure and form the excavated surface 24 free of decay.

Figure 2:
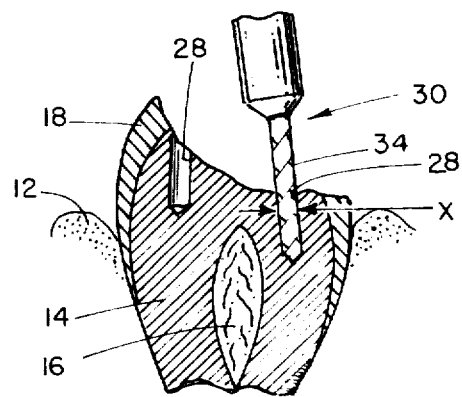
FIG. 2 is a cross-sectional view of a tooth similar to FIG. 1, and illustrates the step of providing channels in the dentition pursuant to the invention.

The first step in providing a superstructure 26 (FIG. 7) pursuant to the present invention, is to provide a plurality of channels 28, as shown in FIG. 2, extending into the dentin 14 from the excavated surface 24. For this purpose, a spiral drill 30 is urged into the dentin in a conventional manner. As presently constructed, the bit 34 of drill 30 may have a preferred diameter of, for example, 0.028 inches. The number of channels 28 needed in a particular understructure will vary with the area of excavated surface 24 and portion of dentin 20 and enamel 22 that must be replaced by superstructure. Indeed, a single channel may be sufficient in some instances. However, more likely than not, a plurality of channels 28 are often necessary, and this requirement underscores certain of the principles of the present invention, as will be discussed below.

Figures 3, 4:
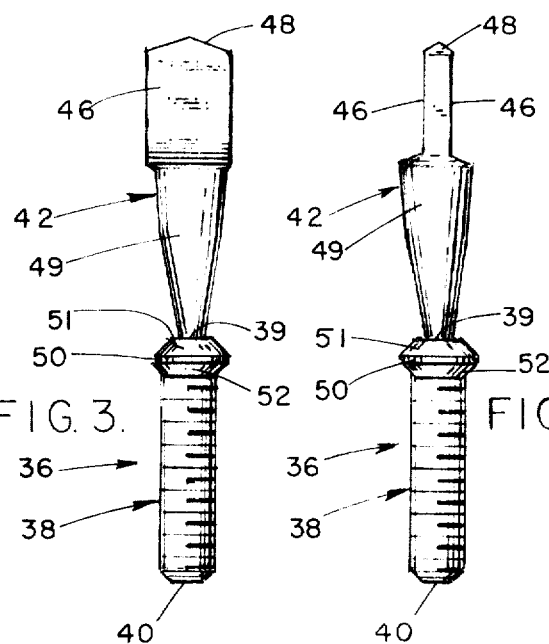
FIGS. 3 and 4 are enlarged front and side views respectively of the anchoring pin illustrating the fracture portion and head thereof pursuant to the invention.
Figure 6:
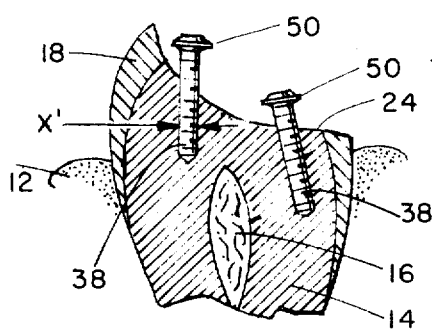
FIG. 6 is a view similar to FIG. 5 and illustrates the anchoring pins projecting from the tooth understructure.

The second step in providing a superstructure 26 pursuant to the present invention is to insert the anchoring pins 36 into each of the channels 28. In the preferred embodiment, as seen in FIGS. 3 and 4, the anchoring pins 36 are constituted of stainless steel, have respective self-threading body portions 38 provided with a bevel end 40 and a manipulating portion 42. Between the manipulation portion 42 and the body portion 38, a fracture or weakened portion 39 is provided to facilitate severing the manipulating portion 42 from the body portion 38. The manipulating portion 42 is provided with torque transferring means or laterally opposing faces 46 which terminate in the marginal edge 48. The manipulating portion 42 further includes a frusto-conical guide portion 49 terminating in a point of minimal diameter the latter to constitute the fracture or weakened portion 39. As presently constructed in the preferred embodiment, the body portion 38 has a diameter of, for example, 0.030 inches. Consequently, it is apparent that X', shown in FIG. 6 as representing the diameter of the body portion 38, is greater than the dimension X shown in FIG. 2 as representing the diameter of the channel 28. Thus, the body portion 38 may be tightly threaded into its respective channel 28.

As illustrated clearly in FIGS. 3 and 4, the anchoring pins 36 are each provided with an anchoring flange head 50 or, as will be evident from the description below, a displacement resisting means that prevents displacement of the superstructure 26 relative to the tooth understructure 14 axially along the pins 36. The anchoring flange head 50 includes opposing annular faces 51 and 52 of greater lateral dimension than that of the body portion 38 for enhancing the resistance against displacement of the superstructure 26 relative to the understructure 14.

Figure 5:
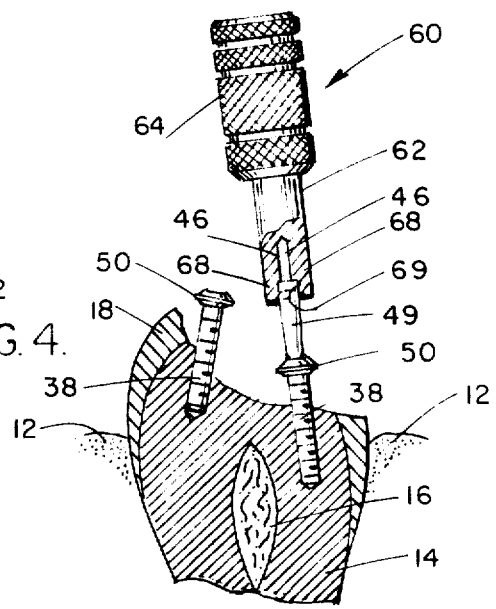
FIG. 5 is a view similar to FIG. 2 and illustrates the stage of inserting the anchoring pins into the tooth understructure pursuant to the invention.

A tool attachment 60 is provided to insert the anchoring pins 36 into channels 28. As is best shown in FIG. 5, the tool 60 is comprised of a body 62 having knurled end 64. At its other end, the body 62 has a pair of laterally spaced limbs or gripping prongs 68 adapted to receive the manipulating portion 42 of the anchoring pin 36. As is illustrated in FIG. 5, the opening formed between the prongs 68 includes an axially extending bore 69 which is diametrically extended to form diametrically opposite restrictive channels into which the lateral faces 46 of the manipulating portion 42 may be seated.

The third step, pursuant to the invention, is to insert an anchoring pin 36 into a channel 28. The manipulating portion 42 of a pin 36 is inserted and fully seated between the prongs 68. The tool 60 is then used to guide the bevel end 40 of the pin 36 into a channel opening 28. A slight downward pressure, in combination with a clockwise rotation is used to thread the pin 36 to the bottom of the channel 28. Since diameter X' of the pin 36 exceeds diameter X of the channel 28, the threaded portion 38 will thread itself into the dentin side walls of channel 28. When fully inserted into a channel 28, the manipulating portion 42, the anchoring flange head 50, and a small exposed portion of the threaded body portion 38, will project above the excavated surface 24.

Upon further rotation of the tool 60, with the pin 36 fully seated in its associated channel 28, the manipulating portion 42 severs from the anchoring flange head 50 at the weakened portion 39. This pin-severing operation is repeated as required so that all of the channels 28 accommodate pins 36 in partially protruding relation. It is clear that the weakened portion 39 is of sufficient reduced thickness to permit a ready severing of the manipulating portion 42 from the flange head 50 and threaded portion 38 without overstressing the tooth understructure laterally or axially which may otherwise fracture the tooth understructure.

Figure 7:
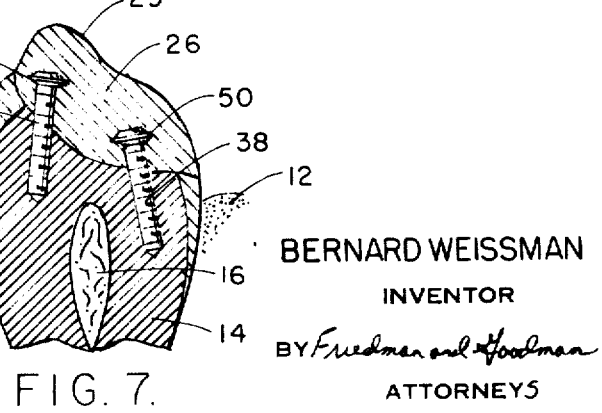
FIG. 7 is a view similar to FIG. 6 and illustrates the anchoring pins as securing the superstructure to the tooth understructure.

Having a rod inserted in each channel, the ultimate step is to build the superstructure on the exposed excavated surface now provided with anchoring projections utilizing the potential support capacity of the understructure of the tooth for anchoring the superstructure thereto. This latter procedure, which does not form the basis of the present invention, has been described in my U.S. Pat. No. 3,434,209, issued on Mar. 25, 1969, to which reference may be made, and results in a repaired tooth, as shown in FIG. 7, wherein the superstructure 26, having an upper surface 29, is fixed to the understructure or body 14 of the tooth.

It is noteworthy, that as the anchoring flange head 50 is embedded in the superstructure 26, there is effected an enhanced resistance to displacement of the superstructure 26 relative to the understructure 14. It is possible that the threaded portion 38 of the anchoring pins 36 may serve to anchor the superstructure 26 to the understructure 14 in the absence of the anchoring flange head 50, but it is equally clear that prolonged prevention of displacement of the superstructure 26, relative to the understructure 14, cannot be adequately maintained in the absence of an anchoring flange head 50. Clearly, therefore, the provision of an anchoring pin 36 with the enlarged anchoring flange head 50 and the severability of the manipulating portion 42 from the latter, pursuant to the present invention, is a vast improvement over those conventionally known.

It should be further clarified that the manipulating portion 42 has an elongate extent which is at least equal to, but preferably greater than, the elongate extent of the threaded body portion 38. This is important to provide means for manipulating the dental anchor in areas in the mouth of the patient which are inaccessible or at the very least difficult to operate in. The enhanced elongate extent of the manipulating means 42 serves to accomplish this end.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A dental anchor for securing a superstructure to a tooth understructure, said dental anchor comprising an elongate member, said elongate member integrally including a self-securing anchoring portion for operative association with a tooth understructure, a displacement-resisting anchoring portion for operative displacement-resisting association with a superstructure, a manipulating portion for permitting manipulation of said self-securing anchoring portion, and a weakened portion interposed between said manipulating portion and said displacement-resisting anchoring portion for permitting selective self-severing of the two latter said portions from one another, said manipulating portion terminating in a free end and having an elongate extent substantially the same as the elongate extent of said self-securing anchoring portion, said free and including means for permitting self-severing of said manipulating portion from said displacement-resisting anchoring portion.

2. A dental anchor as claimed in claim 1, wherein said weakened portion is constituted as a portion of reduced thickness in said elongate member.

3. A dental anchor as claimed in claim 1, wherein said self-securing anchoring portion is constituted as a helically threaded external portion of generally cylindrical extent.

4. A dental anchor as claimed in claim 1, wherein said displacement-resisting anchoring portion includes a pair of opposing flange faces generally extending laterally of said elongate member.

5. A dental anchor as claimed in claim 4, wherein said pair of opposing flange faces are of generally annular extent.

6. A dental anchor as claimed in claim 5, wherein said pair of opposing flange faces are of greater lateral extent than that of said elongate member.

7. A dental anchor as claimed in claim 6, wherein said self-securing anchoring portion includes a helically threaded surface terminating at one flange face.

8. A dental anchor as claimed in claim 2, wherein said elongate member is metallic and of sufficient reduced thickness at said weakened portion such that said manipulating means is readily severable from said displacement-resisting anchoring portion simply upon rotation of the two latter said portions relative to one another.

9. A dental anchor as claimed in claim 8, wherein said manipulating portion includes guide means for axially guiding the elongate member into operative association with the tooth understructure, and torque-transferring means for rotatably displacing said self-securing anchoring portion into operative association with said tooth understructure.

10. A dental anchor as claimed in claim 9, wherein said guide means includes a frusto-conical extent cooperable at least in part with a dental tool and terminating in a portion of minimum diameter at said displacement-resisting anchoring portion to constitute said weakened portion, and said torque-transferring means includes a pair of opposing endmost flat faces responsive to rotation of the dental tool.

11. A dental anchor as claimed in claim 8, wherein said manipulating means has an elongate extent which is slightly greater than that of said self-securing anchoring portion.

* * * * *